United States Patent Office 3,600,436
Patented Aug. 17, 1971

3,600,436
(3-OXOPENTA-1,4-DIEN-1,5-YLENE)-BIS-
[(p-PHENYLENEOXY)ACETIC ACID]
Stephen J. Kuhn and Janet E. Havsky, Sarnia, Ontario,
Canada, assignors to The Dow Chemical Company,
Midland, Mich.
No Drawing. Filed May 22, 1968, Ser. No. 731,293
Int. Cl. C07c 65/00
U.S. Cl. 260—520                      1 Claim

ABSTRACT OF THE DISCLOSURE

Disclosed is (3-oxopenta-1,4-dien-1,5-ylene) - bis - [(p-phenyleneoxy)acetic acid] which compound is a useful insecticide.

---

The present invention relates to a novel and useful compound (3-oxopenta - 1,4 - dien-1,5-ylene)-bis-[(p-phenyleneoxy)acetic acid] which can be represented by the Formula I:

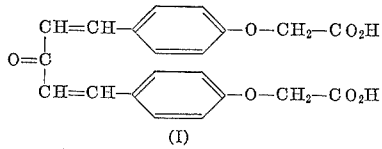

(I)

This compound is a crystalline solid which is somewhat soluble in organic solvents but relatively insoluble in water. It is useful as an insecticide in the control of a wide variety of insect pests such as flies, beetles and roaches.

The compound of the present invention is prepared by reacting and condensing together 4-formylphenoxyacetic acid of the Formula II:

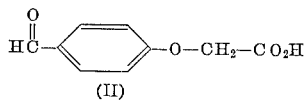

(II)

and acetone.

The reaction is conducted in the presence of an alkali metal hydroxide as catalyst, such as sodium hydroxide, potassium hydroxide, and lithium hydroxide, and conveniently in a liquid reaction medium such as can be provided by any of a wide variety of organic solvents or mixtures thereof, for example, alkanols (ethanol, methanol), amides (dimethylformamide), water, and other polar, inert solvents. The amounts of the reactants to be employed are not critical, some of the product being formed when employing any proportions. The reaction consumes the reactants, however, in the ratio of two moles of the 4-formylphenoxyacetic acid per mole of acetone compound and the employment of such proportions is preferred.

Since the alkali metal hydroxide participates in the reaction, it is critical that at least one mole or a small amount in excess of alkali metal hydroxide be employed per mole of acetone reactant in order to provide a catalytic amount of catalyst. Preferably, the alkali metal hydroxide is employed in amounts of 10 mole percent excess or more, and preferable up to about a 50 mole percent excess. A large excess does not interfere with the reaction but is undesirable from the standpoint of economy.

In carrying out this reaction, the formylphenoxyacetic acid, acetone, alkali metal hydroxide, and solvent, if employed, are contacted and maintained together in any convenient fashion. In one manner, the alkali metal hydroxide is added to the solution of the formylphenoxyacetic acid and acetone reactant. The reaction is allowed to proceed at room temperature or with slight heating up to about 100° C., preferably, from about 20° to 50° C. and with stirring. After a period of time sufficient to produce the desired product has elapsed, the reaction mixture is neutralized with a dilute acid solution and thereafter conventionally treated to isolate the product. Such conventional procedures include filtration, recrystallization, and the like.

The following example serves further to illustrate the invention and the manner by which it can be practiced but, as such, should not be construed as a limitation upon the overall scope hereof.

EXAMPLE p-Formylphenoxyacetic acid (18.0 grams; 0.10 mole) and acetone (2.9 grams; 0.05 mole) are dispersed in 100 milliliters of ethanol with stirring at room temperature. While vigorous stirring is continued at room temperature, 25 milliliters of a 10 percent aqueous sodium hydroxide (0.06 mole of sodium hydroxide) are added to the reaction mixture and the stirring is continued until it solidifies. Water (100 milliliters) is added to the sold and the resultng mixture is then acidified with dilute (10 percent) hydrochloric acid which initiates precipitation. The precipitated yellow crystals are separated on a sintered glass filter and washed with five 25 milliliters portions of water. The crystals are allowed to dry and are then recrystallized from boiling dimethylformamide (153° C.) to obtain the desired (3-oxopenta-1,4-dien - 1,5 - ylene)-bis-[(p-phenyleneoxy)acetic acid] product as yellow crystals having a melting point of 237° C. (with decomposition).

Elemental analysis.—Calculated for $C_{21}H_{18}O_7$ (percent): C, 65.9; H, 4.7. Found (percent): C, 65.0; H, 4.9.

The compound of the present invention is useful as an insecticide for the control of a wide variety of insect pests. For such use, the unmodified compound can be employed. Alternatively, the compound can be dispersed on an inert finely divided solid to prepare dust compositions. The latter dust compositions can be dispersed in water with or without the aid of a wetting agent, the resulting aqueous dispersion employed as sprays. In other procedures, the compound can be employed as a constituent in oils or solvents or as a constituent in solvent-in-water or water-in-solvent emulsions or dispersions which can be employed as sprays, drenches or washes. Good results are obtained when employing compositions containing insecticidal concentrations and usually from about 50 to 10,000 parts per million by weight of the compound.

In representative operations, aqueous compositions containing 1000 parts per million by weight of (3-oxopenta-1,4-dien - 1,5 - ylene)-bis-[(p-phenyleneoxy)-acetic acid] give substantially 100 percent controls and kills of American cockroaches.

The starting compound, 4-formylphenoxyacetic acid, is a known compound and can be prepared in accordance with known procedures. In one manner, the sodium salt of p-hydroxybenzaldehyde is formed and reacted with sodium 2-chloroacetate with slight heating. The reaction mixture is treated with a sodium bicarbonate solution and thereafter the product 4-formylphenoxyacetic acid is precipitated by the addition of hydrochloric acid to the reaction mixture. It can then be recovered by filtration.

What is claimed is:
1. (3 - oxopenta-1,4-dien-1,5-ylene)-bis-[(p-phenyleneoxy)acetic acid].

References Cited

UNITED STATES PATENTS
3,448,105     6/1969     Griot _____ 260—246

LEWIS GOTTS, Primary Examiner
E. J. GLEIMAN, Assistant Examiner

U.S. Cl. X.R.
424—317